Patented Aug. 25, 1925.

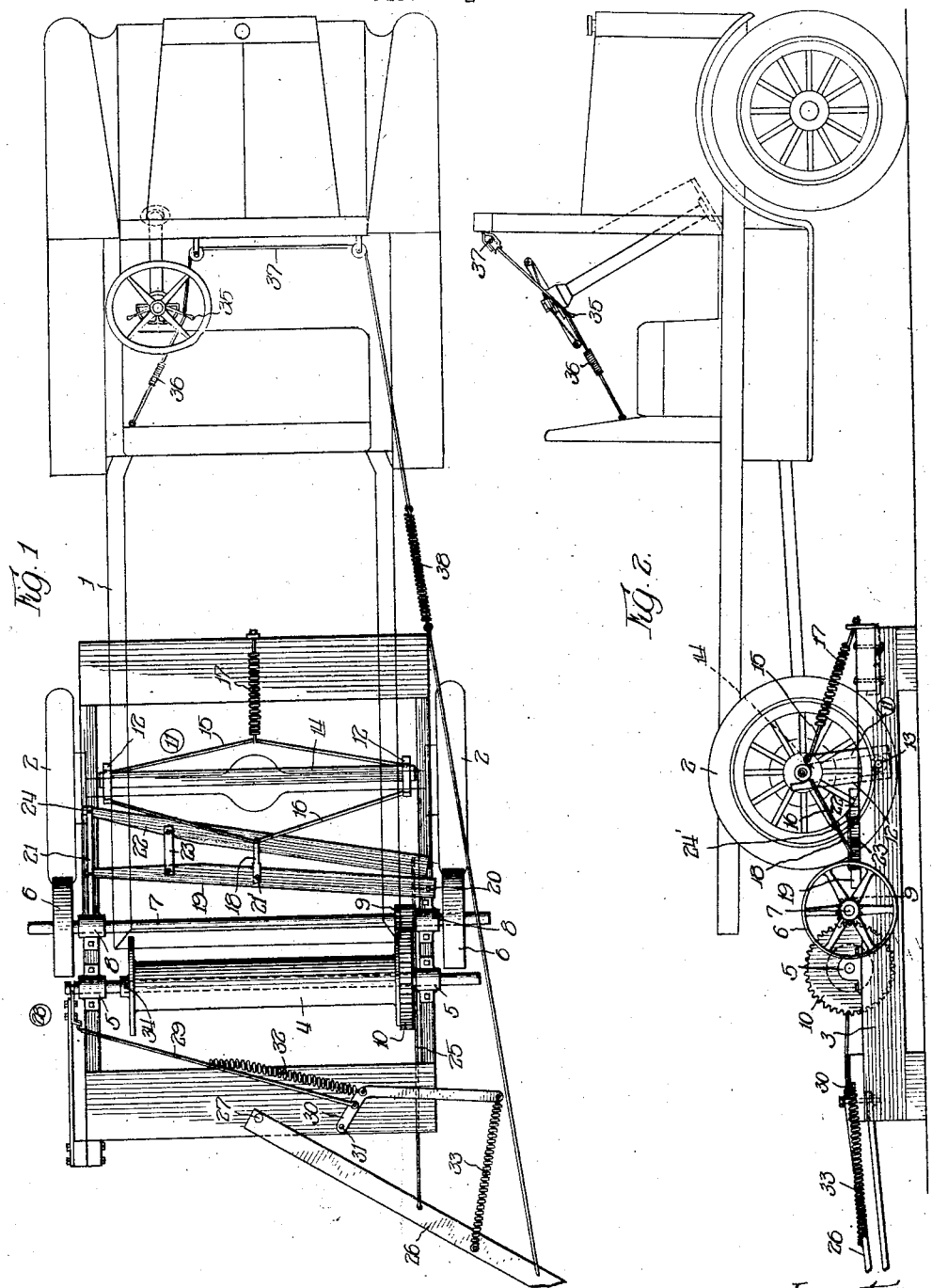

1,551,309

UNITED STATES PATENT OFFICE.

ALEXANDER G. HUGHES, OF ANTIOCH, ILLINOIS.

HOISTING RIGGING.

Application filed August 17, 1923. Serial No. 657,874.

*To all whom it may concern:*

Be it known that I, ALEXANDER G. HUGHES, a citizen of the United States, residing at Antioch, in the county of Lake and State of Illinois, have invented certain new and useful Improvements in Hoisting Rigging, of which the following is a specification.

The present invention relates to hoisting rigging.

More particularly the present invention relates to apparatus which may be used with a mechanical source of power for the purpose of transmitting power from said source to other translating devices. In many places, particularly on farms, it is desirable to have a source of power which may be readily moved about from place to place. An automotive vehicle provides a readily accessible source of power, but, though providing a considerable horse power for the purpose of driving said vehicle, is not convenient for other purposes, such as hoisting.

An object of the present invention is to provide a rigging which will cooperate with an automotive vehicle or other source of power to efficiently transmit power from said source to other translating devices.

A further object is to provide a rigging by means of which the wheels of an automotive vehicle may be readily lifted from the ground and moved to positions in and out of driving relation with power transmitting mechanism.

A further object is to provide a rigging for transmitting power from a source of power, which rigging may be conveniently operated at a considerable distance by means of the ordinary trip rope, such as ordinarily used on farms for controlling farm machinery at a distance.

A further object is to provide a rigging for transmitting power from the driving wheels of an automotive vehicle which may be conveniently operated to control the driving relation between said automotive vehicle and said rigging.

A further object is to provide a novel combination of a source of power and rigging whereby the driving relation between said source of power and said rigging may be established or disestablished and the power developed by said source of power may be conveniently controlled at a distance.

Further objects will appear as the description proceeds.

Referring to the drawings—

Figure 1 is a top plan view of one embodiment of the present invention; and

Figure 2 is a view in side elevation, parts being broken away to better illustrate the invention.

The numeral 1 indicates a source of power, which is illustrated in the present instance as an automotive vehicle, which may be of any of the makes on the market, said vehicle being provided with rear driving wheels 2—2. The numeral 3 indicates a framework, said framework being provided with the hoisting drum 4 mounted for rotation in the bearings 5—5. As will be explained hereinafter, the hoisting drum 4 is capable of longitudinal movement for the purpose of throwing same into or out of cooperative relationship with the remainder of the power transmitting members of the rigging. The numerals 6—6 indicate pulleys fixedly mounted upon the transverse shaft 7, which shaft is rotatably mounted in the bearings 8—8. Said pulleys 6—6 will be spaced apart a distance at which vehicle wheels are ordinarily spaced. The transverse shaft 7 is provided with the pinion 9 adapted to mesh with the gear 10, which may be in fixed relation with the drum 4. It will be clear that if the drum 4 is moved longitudinally, the gear 10 will be moved into and out of meshing relation with the pinion 9. Longitudinal movement of the drum 4 is accomplished by mechanism which will be referred to hereinafter.

Mounted upon the forward portion of the frame 3 is a cradle, which is indicated as a whole by the numeral 11. Said cradle 11 comprises a pair of supporting members 12—12, which have a rocking movement about the axis indicated by the numeral 13. A bar 14 may be provided for constraining the supporting members 12—12 to rock in unison. The supporting members 12—12 are adapted to engage the rear axle of an automotive vehicle and in a rocking movement to raise said automotive vehicle from the ground and move same rearwardly for bringing the rear wheels of said vehicle into cooperative relationship with said pulleys 6—6. The two supporting members 12—12 have secured thereto the bars 15 and 16, the forward bar 15 being connected by means of a tension spring 17 to the forward end of the frame 3. The rear bar 16 is connected by means of the strap 18 to the lever 19, which lever 19 is pivoted for rotation about the axis 20, the other end of said lever being slidably mounted under the strap 21. A readily insertable and removable pin 21' may be used for connecting strap 18 to lever 19. The lever 19 is connected to a second lever 22 by means of the strap 23, said lever 22 being pivoted for rotation about the axis 24. Clockwise movement of lever 22, as viewed in Figure 1, may be limited in any preferred way, preferably by abutting against cradle 11. The free end of lever 22 has connected thereto the flexible connector 25, the other end of said flexible connector 25 being connected to the lever arm 26, which lever arm is pivotally mounted about the axis 27. A trip rope may be connected to the outer end of the lever 26 by means of which the lever 26 may be controlled from a distance.

The axial movement of the drum 4 and gear wheel 10 referred to above is controlled by a clutching device, indicated by the numeral 28, which clutching device is in turn controlled by the rod 29. The rod 29 is pivotally connected to the lever 30, which is pivoted about the axis 31. A tension spring 32 is connected to the lever 30 at one end and to frame 3 at its other end. The lever 30 is resiliently connected to the operating lever 26 by means of the spring 33. The lever 30 is illustrated as being bent intermediate of its ends, the spring 32 being connected to said lever near the bend thereof. The rod 29 is connected between the pivotal mounting of the lever 30 and the point at which the spring 32 is connected. The drum 4 may be provided with a lug 34, which may be engaged by a chain or other flexible connector for a purpose which will be referred to hereinafter.

The fuel control lever of the automotive vehicle is indicated by the numeral 35. Said fuel lever may be resiliently urged to throttling position by means of the spring 36, which may be anchored to a part of the body of the automotive vehicle. A flexible connector 37 is provided between the fuel control lever 35 and the operating lever 26, said flexible connector 37 being provided intermediate of its length with the extensible spring 38.

When it is desired to use the automotive vehicle or other source of power for use in combination with the hoisting rigging embodying the principles of the present invention, the frame 3 will be located in the region where the work is to be performed. The vehicle 1 will be backed up to the frame so that the rear wheels thereof are in proximity to the forward edge of said frame. The pin 21' will have been removed and the supporting members 12—12 will be in a forward position at this time, being urged to such position by the spring 17. A chain may be provided, one end of which may be hooked over the rear axle of the automotive vehicle, the other end being connected to the lug 34. The drum 4 will preferably be flanged and the operator may readily pull the automotive vehicle up over the frame 5 by merely applying manual force to one of the flanges of drum 4. The operator will see that the supporting members 12—12 engage the rear axle of the vehicle so that as said supporting members 12—12 are drawn up toward a vertical position, the rear wheels of the vehicle will be raised from contact with the ground. When the parts are in this position, the strap 18 may be fastened to the lever 19 by means of pin 21'. After the strap 18 has been thus pinned to the lever 19, there will be no possibility for the vehicle to roll off the frame 3.

The parts are now in position for operation. The drum 4 will be provided with a hoisting rope, which may be connected at its other end to the material to be hoisted. The engine of the automotive vehicle may be started and, for most operations, put in high gear. In order to perform the hoisting operation, the operator will move the lever 26 in a clockwise direction, which movement may be accomplished directly or by means of a trip rope. In view of the multiplication of power provided by the levers 26, 19 and 22, and in view of the fact that the rear of the automotive vehicle is in a state of unstable equilibrium, a very small pull on the end of lever 26 will be sufficient to control the mechanism. It has been found in practice that the level 26 may be operated from a distance of several hundred feet by providing a rope of such a length and of sufficiently small diameter to reduce the resistance due to dragging along the ground. Movement of the lever 26 will accomplish several functions. It will pull the lever 22 in a clockwise direction about the axis 24. Inasmuch as the lever 22 is connected to the lever 19 by means of the strap 23, movement of said lever 22 will communicate movement to the lever 19 about the axis 20. Inasmuch as the lever 19 is connected to the cradle 11 by means of the strap 19, and inasmuch as the cradle 11 controls the movement of the automotive vehicle, the net result will be the bodily movement of the automotive vehicle rearwardly, so that the rear wheels of said vehicle will engage the pulleys 6—6. The lever 26 by the same movement controls the flexible connector 37 for operating the fuel control lever 35 of the automotive vehicle to admit more fuel to the engine of said vehicle, whereby to increase the power developed by said vehicle. Furthermore, the movement of the lever 26 in a clockwise direction will result in the shifting of the gear 10 into meshing relation with the pinion 9. The latter movement is caused by reason of the fact that the resilient connector 33, acting through the lever 30, rod 29 and clutch 28, causes the longitudinal movement of drum 4 and gear 10. If the gear 10 and pinion 9 should not be properly positioned for the meshing of the teeth thereof, the resilient connector 33 will yield until the rotation of pinion 9 has brought the teeth thereof into proper meshing relation with the teeth of the gear wheel 10. The tension of the resilient connector 33 will then cause the gear wheel 10 to move into meshing relation with the pinion 9. At this time there is no hoisting load on the drum 4, so that no difficulty is encountered in the longitudinal movement of drum 4. Turning movement will be communicated to the drum 4 as long as a pull is exerted on the lever 26, so that a rope upon said drum 4 will be wound up upon said drum for hoisting or any other purpose. When the drum 4 has been rotated to the required extent, the operator will release the pull on the operating lever 26, whereupon spring 17 will pull the cradle 11 and thereby the automotive vehicle forward so that the rear wheels of said vehicle are out of contact with the pulleys 6—6, spring 36 will close the fuel lever 35 and spring 32 will shift the clutch 28 and thereby move gear 10 out of meshing relation with pinion 9. At this time the drum 4 is free to turn and the hoisting rope may be readily unwound therefrom.

It will be understood that though the present invention has been illustrated in connection with an automobile, any other type of automotive vehicle may be used and that the invention is applicable to any other source of power having power transmitting members which may be moved into and out of operative relationship with the rigging as above described. One embodiment of the present invention has been described in detail. Many modifications will occur to those skilled in the art. It is intended in this patent to cover all such modifications that fall within the scope of the invention as defined by the appended claims.

What is claimed is:

1. In combination, a source of power having means for controlling said power, a hoisting rigging, including a rocking member for controlling the position of said source of power, means for controlling said rocking member, a hoisting drum, means for transmitting power from said source to said drum, means for controlling the operativeness of the connection between said drum and said source, and common operating means for controlling the power developed by said source, said rocking means and said power transmitting means.

2. Hoisting rigging, comprising a reciprocating member, means for controlling said reciprocating member, a shaft mounted adjacent to said reciprocating member, said shaft being provided with a pair of pulleys adapted to be engaged by the rear wheels of an automotive vehicle, a pinion upon said shaft, a drum adapted to be driven by said pinion, means upon said drum adapted to engage a flexible connector for transmitting power from said drum to said automotive vehicle for moving said automotive vehicle into operative relation with said pulleys, means for controlling the driving relation between said pinion and said drum, and unitary control means for controlling said driving relation and controlling said reciprocating controlling means.

3. In combination, an automotive vehicle having a fuel control member, a connector for operating said fuel control member, means for lifting the rear wheels of said automotive vehicle and for moving said automotive vehicle longitudinally, a pair of pulleys adapted to engage said rear wheels, means for controlling the driving relation between the rear wheels of said automotive vehicle and said pulleys, a drum adapted to be driven from said pulleys, means for controlling the connection between said drum and said pulleys, and a single operating member for controlling said throttle control means and said drum connection control means.

4. In combination, an automotive vehicle and means for transmitting power from the rear wheels of said vehicle to other translating devices, said means comprising a reciprocating member and means for operating said reciprocating member, a pair of pulleys adapted for engagement with the rear wheels of said vehicle, a drum adapted to be operatively associated with or disassociated from said pulleys, means upon said drum adapted to engage a flexible connector for transmitting power from said drum to said vehicle for moving said vehicle into operative relationship with said pulleys, means for controlling the throttle of said automotive vehicle, and common means for controlling said reciprocating member operating means and said throttle control means.

5. In combination, an automotive vehicle and means for transmitting power from the rear wheels of said automotive vehicle to other translating devices, said means comprising a reciprocating member and means for operating said reciprocating member, a pair of pulleys adapted for engagement by the rear wheels of said vehicle, a rotatable drum, power transmitting mechanism between said pulleys and said drum, means for controlling said power transmitting mechanism, means for controlling the throttle of said automotive vehicle, and common means for controlling said power transmitting mechanism, said reciprocating member operating means and said throttle control means.

Signed at Antioch, Illinois, this 27th day of July, 1923.

ALEXANDER G. HUGHES.